US 8,244,672 B1

(12) United States Patent
Thenthiruperai et al.

(10) Patent No.: US 8,244,672 B1
(45) Date of Patent: Aug. 14, 2012

(54) METHOD AND SYSTEM FOR ESTABLISHING AN APPLICATION CONTACT LIST

(75) Inventors: Balaji S. Thenthiruperai, Overland Park, KS (US); R. Brian Landers, Leawood, KS (US); Benjamin Blinn, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1551 days.

(21) Appl. No.: 10/931,171

(22) Filed: Aug. 31, 2004

(51) Int. Cl.
 *G06F 17/30* (2006.01)
(52) U.S. Cl. ...................................................... 707/621
(58) Field of Classification Search .................. 707/100; 715/739
 See application file for complete search history.

(56) References Cited

U.S. PATENT DOCUMENTS

| | | | |
|---|---|---|---|
| 6,035,220 A * | 3/2000 | Claudio et al. | 455/564 |
| 6,760,431 B1 * | 7/2004 | Haimi-Cohen | 379/355.01 |
| 6,763,226 B1 * | 7/2004 | McZeal, Jr. | 455/90.2 |
| 6,829,607 B1 * | 12/2004 | Tafoya et al. | 707/6 |
| 6,850,986 B1 * | 2/2005 | Peacock | 709/232 |
| 6,901,559 B1 * | 5/2005 | Blum et al. | 715/811 |
| 6,950,988 B1 * | 9/2005 | Hawkins et al. | 707/1 |
| 7,007,239 B1 * | 2/2006 | Hawkins et al. | 707/7 |
| 7,025,209 B2 * | 4/2006 | Hawkins | 209/217 |
| 7,158,630 B2 * | 1/2007 | Fotta et al. | 379/266.08 |
| 7,284,002 B2 * | 10/2007 | Doss et al. | 707/10 |
| 2001/0032254 A1 * | 10/2001 | Hawkins | 709/219 |
| 2003/0018708 A1 * | 1/2003 | Hlasny | 709/203 |
| 2003/0212863 A1 * | 11/2003 | Ganguly et al. | 711/118 |
| 2004/0098349 A1 * | 5/2004 | Tolson | 705/64 |
| 2004/0202117 A1 * | 10/2004 | Wilson et al. | 370/310 |
| 2004/0203580 A1 * | 10/2004 | Engelhart | 455/406 |
| 2004/0250212 A1 * | 12/2004 | Fish | 715/752 |
| 2004/0261031 A1 * | 12/2004 | Tuomainen et al. | 715/739 |
| 2006/0025113 A1 * | 2/2006 | Nguyen et al. | 455/412.1 |

OTHER PUBLICATIONS

Handspring, "Treo 270 Communicator User's Guide GPRS 1.1, Windows Edition", Feb. 16, 2004, p. 1, 17, 26, 36, 43, 59, 69, 70,82, 84, 89, 90, 101, 134, 171, 190, 192, 213, 218, 221,224, 252.*
Handspring, "Treo 270 Communicator User's Guide GPRS 1.1, Windows Edition", Feb. 16, 2004, p. 1-257.*
RIM, BlackBerry Handheld User's Guide, Sep. 7, 1999, p. 1-40.*
RIM, "BlackBerry Desktop Software: Installation and Getting Started Guide", Jun. 12, 2000, p. 1-19.*

* cited by examiner

*Primary Examiner* — Khanh Pham

(57) ABSTRACT

A method and system for establishing an application contact list is provided. A user will establish a master contact list on a client station. In response to execution of an application using a contact entry from the master contact list, the client station will then designate the contact entry as a member that is associated with the executed application. In this manner, the client station will mark contacts based on the applications that used the contacts. In addition, the client station generates application contact lists by filtering the master contact list to identify contact entries that are associated with an initiated or executed application. The client station then generates an application contact list including the contact entries that are associated with the application. The user may then select a contact entry from the application contact list for use in execution of the application.

5 Claims, 7 Drawing Sheets

METHOD AND SYSTEM FOR ESTABLISHING AN APPLICATION CONTACT LIST

FIELD OF INVENTION

The present invention relates to communications, and more particularly, to establishing contact lists specific to individual applications.

BACKGROUND

Many client devices today include a "contacts" function that is an electronic address book and/or an information storage function. A contact refers to a person or business about whom several types of information can be recorded, such as an e-mail address, street address, multiple phone numbers, and any other information that relates to the contact, such as a birthday or anniversary date, for example.

Applications can use contacts to simplify execution of the applications. For example, a user may select a contact from a contact list to initiate an email message to the contact, or to establish a phone call with the contact.

To perform such a task, a user typically scrolls through his/her address books and master contact lists in the address books, and selects the contact entry corresponding to the person or business that the user wishes to contact. However, this can become burdensome if the master list is large, if the user has multiple address books, and/or if the user is operating a small handheld device with limited display capabilities. In these instances, a user may find it more convenient to enter the contact information to execute the application rather than searching through many entries to locate the stored contact information.

In addition, as contact information changes, a user may need to manually update or modify his contact lists or organization of the lists due to such changes or other changes in the user's communication patterns, for example.

SUMMARY

In an exemplary embodiment, a method of selecting contact entries for an application contact list is provided. The method includes executing an application using a contact entry, which includes information pertaining to a user of a client station. The method further includes designating the contact entry to be associated with the application.

In another respect, the exemplary embodiment may take the form of a method of establishing an application contact list on a client station, which includes a master contact list including contact entries for a user of the client station. The method comprises identifying a network user that subscribes to a service associated with a network application. The method further includes determining if a contact entry in the master contact list corresponds to the network user, and if so, designating the contact entry in the master list to be associated with the network application.

In another embodiment, the method of establishing an application contact list on a client station includes initiating an application and filtering the master contact list to identify contact entries that are associated with the application. The method also includes generating the application contact list, which includes the contact entries that are associated with the application.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

DETAILED DESCRIPTION OF EXEMPLARY EMBODIMENTS

In accordance with an exemplary embodiment, a mechanism for establishing application contact lists is provided. A user will establish a master contact list on a client station, which may execute many different types of applications, such as email or push-to-talk (PTT), for example, using contacts from the master contact list. In response to execution of an application using a contact entry from the master contact list, the client station will then designate the contact entry as a member that is associated with the executed application. In this manner, the client station will mark contacts based on the applications that have used the contacts.

The client station may then use the designations to generate application contact lists. For example, after initiating an application, the client station filters the master contact list to identify contact entries that are associated with the application. The client station then generates an application contact list including the contact entries that are associated with the application. The user may then select a contact from the application contact list, which probably will (but may not) be a shortened version of the master contact list, and thus will enable the user to scroll through the list more quickly to find a desired contact.

I. Client Station

Figure 1:
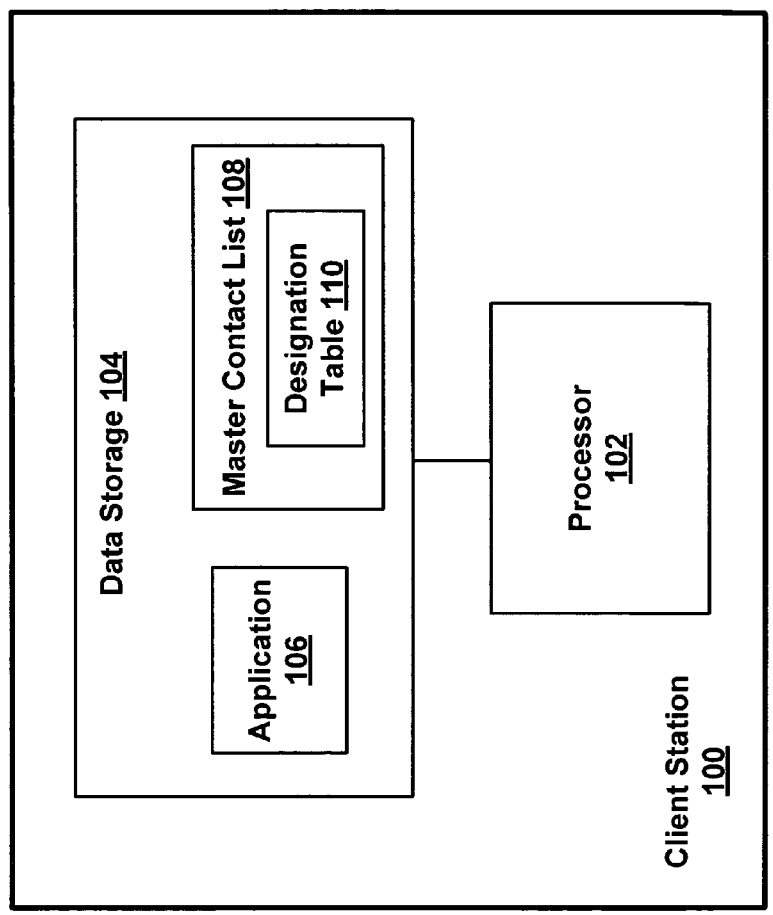
FIG. 1 is a block diagram illustrating one embodiment of a client station operable to perform functions according to exemplary embodiments of the present invention.

Referring now to the figures, FIG. 1 is a block diagram illustrating one embodiment of a client station 100. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

The client station 100 includes a processor 102 coupled to data storage 104. The processor 102 may operate according to an operating system, which may be any suitable commercially available embedded or disk-based operating system, or any proprietary operating system. The processor 102 may comprise one or more smaller central processing units, including, for example, a programmable digital signal processing engine.

The data storage 104 may include main memory and secondary storage. The main memory may include random access memory (RAM). Main memory can also include any additional or alternative memory device or memory circuitry. Secondary storage can be provided as well and may be persistent long term storage, such as read only memory (ROM), optical or magnetic disks, or any other volatile or non-volatile storage systems. However, any type of memory may be used for the data storage 104.

The data storage 104 stores machine language instructions executable by the processor 102. Of course, machine language is an example, since the instructions may be a higher level computer language. For example, the instructions may take any form, such as for example, object-oriented machine language instructions, like the C++ programming language.

When executed by the processor 102, the instructions can perform functions of an application 106. Further, the instructions could perform functions of a browser (or other display interface) to display a master contact list 108. The application 106 may be any application running on the client station 100, such as an email application, a PTT application, a short message service (SMS) application, etc.

The master contact list 108 includes contact entries corresponding to a user's contacts. The contact entries may include information such as name, phone numbers, street addresses, email addresses, network address identifiers (NAI) or other network user identifiers, and other contact information pertaining to a specific individual or a business, for example. Table 1 illustrates one example of contact entry fields that could be populated for a contact entry.

TABLE 1

```
<?xml version="1.0" ?>
<contact>
<presence> </presence>
<name>
<firstname> </firstname>
<middlename> </middlename>
<lastname> </lastname>
</name>
<address>
<street> </street>
<apt_number> </apt_number>
<city> </city>
<state> </state>
<zip> </zip>
</address>
<contactinfo>
<home_phone> </home_phone>
<mobile_phone> </mobile_phone>
<work_phone> </work_phone>
<email01> </email01>
<email02> </email02>
<vision_name> </vision_name>
<im_alias> </im_alias>
<ptt_screenname> </ptt_screenname>
<lightvision_name> <lightvision_name>
</contactinfo>
<business>
<company> </company>
<title> </title>
</business>
</contact>
```

As shown in Table 1, a contact entry could be implemented using the extensible markup language (XML). The XML is described in Yergeau et al., "*Extensible Markup Language (XML) 1.0 (Third Edition),*" W3C Recommendation, 4 Feb. 2004, which is entirely incorporated by reference herein, as if fully set forth in this description. The contact entry fields illustrated in Table 1 are examples only, since other fields may be included, and the contact entry could also be implemented using other computer languages.

The master contact list 108 further includes a designation table 110. The designation table 110 indicates specific applications to which each contact subscribes, or the specific applications for which a user of the client station 100 uses each contact, for example. The designation table 110 may include other information as well.

The client station 100 can take any of a variety of forms. Examples of suitable devices include cellular or PCS telephones, PC cards or data terminals (e.g., wireless web devices such as the RIM Blackberry or the Palm VII™ personal digital assistant), wireless local area network. stations (e.g., stations that are compliant with industry standard 802.11b), and satellite communication terminals. Further, the client station 100 can be a wired device, such as a computer or network telephone. Other examples are possible as well.

II. Method for Establishing an Application Contact List Using a Client Station

Figure 2:
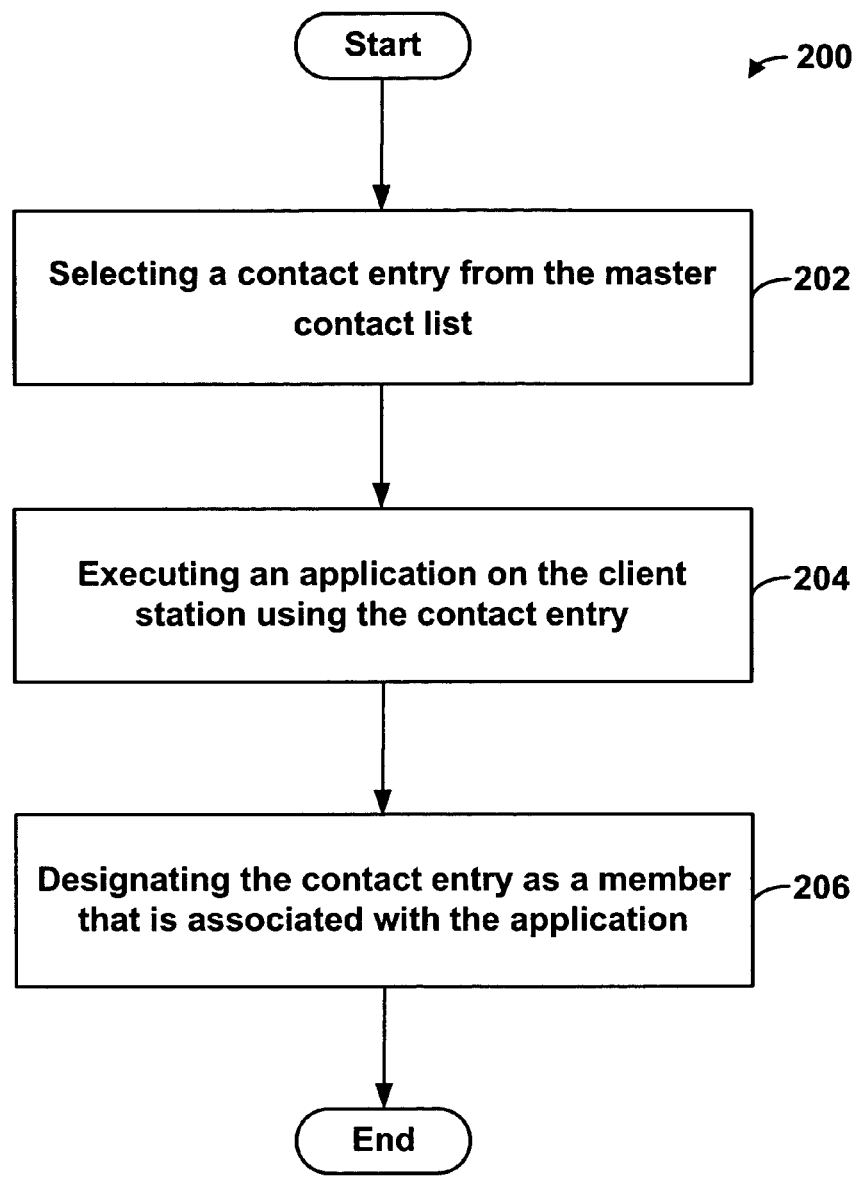
FIG. 2 is a flowchart depicting one embodiment of a method to establish an application contact list for a user of a client station.

FIG. 2 is a flowchart depicting one embodiment of a method 200 to establish an application contact list for a user of the client station 100. Initially, a user of the client station 100 will select a contact entry from the master contact list 108, as shown at block 202. For example, the user can scroll through all of his contacts within the list stored in the data storage 104, and select a contact entry that corresponds to an individual or business that the user desires to contact.

Next, the user will execute an application on the client station 100 using the selected contact entry, as shown at block 204. The user may execute any application for communication purposes or other that may utilize information within the contact entry. For example, the user may execute an email application using the selected contact entry to send an email to the contact. In addition, the user may select a contact to initiate an instant chat session with the contact. The user may execute other applications as well, such as an instant message application to send instant messages to the contact, a telephone application to initiate a phone call with the contact, an SMS application to send an SMS text message to the contact, or a multimedia messaging service (MMS) application to send a multimedia message to the contact. Other examples are possible as well, since contact information may be used within many other applications.

After executing the application using the selected contact entry, the processor 102 then automatically designates the contact entry as a member that is associated with the executed application, as shown at block 206. The processor 102 will access the designation table 110 in the master contact list 108 to mark the contact entry as member of the executed application using some form of an identifier. For example, as conceptually shown below in Table 2, suppose the user executed an SMS application using Bob's contact information. The processor 102 then marks Bob as a contact whom the user has contacted using the SMS application. Table 2 also illustrates other contacts as well, and the applications or services of which they are members. The processor 102 may mark contact entries to be associated with specific applications in the manner as shown below in Table 2.

TABLE 2

| ContactsEmail | Email | PTT | SMS | MMS |
|---|---|---|---|---|
| Bob | X | X | X | X |
| Chris | X |  | X |  |
| Tom |  | X |  | X |

Each time the user executes an application on the client station 100 using a contact, the processor 102 will access the designation table 110 to mark the contact as being associated with that application. Thus, as shown in Table 2, contacts can be members of one or more applications. Contacts could also be members of zero applications as well.

Table 3 illustrates one example of implementing Table 2 for the contact entries of Bob and Chris using the XML computer language. It should be understood that the contact entries shown in Table 3 are examples only, since many other formats or computer languages could also be used.

TABLE 3

```
<?xml version="1.0" encoding="IS0-8859-1" ?>
<contact_all>
<contact>//contact entry for Bob
<default>
    <default_contact>555-486-3926</default_contact>
    </default>
<presence>
    <status>Online</status>
    <status_message>Hangin' Around</status_message>
    </presence>
<name>
    <firstname>Bob</firstname>
    <middlename>A</middlename>
    <lastname>Peoples</lastname>
    </name>
<address>
<address_1>
    <street>Meadow Ln.</street>
    <apt_number />
    <city>Leawood</city>
    <state>Kansas</state>
    <zip>66206</zip>
    </address_1>
<address_2>
    <street />
    <apt_number />
    <city />
    <state />
    <zip />
    </address_2>
    </address>
<contactinfo>
    <home_phone>555-648-3897</home_phone>
    <mobile_phone>555-486-3926</mobile_phone>
    <work_phone>555-762-7568</work_phone>
    <fax />
    <pager />
    <other />
    <email01>bob@sprintspectrum.com4email01>
    <email02>bob@yahoo.com</email02>
    <vision_name>bob@sprintpcs.com</vision_name>
    </contactinfo>
<business>
    <company>Sprint</company>
    <title>Manager, Interaction Design</title>
    </business>
<memberships>
<email>
    <email_member>yes</email_member>
<SMS>
    <SMS_member>yes</SMS_member>
<MMS>
    <MMS_member>yes</MMS_member>
<ptt>
    <ptt_member>yes</ptt_member>
    <ptt_screenname>Bob</ptt_screenname>
```

TABLE 3-continued

```
    </ptt>
<voice_command>
    <vc_member>yes</vc_member>
    <nickname />
    </voice_command>
<instant_messaging>
    <im_member>yes</im_member>
    <im_alias>bob</im_alias>
    </instant_messaging>
<lightvision>
    <lv_member>no</lv_member>
    <lightvision_name />
    </lightvision>
    </memberships>
<personal>
    <birthday />
<marriage>
    <marital_status />
    <spouse />
    </marriage>
    </personal>
    </contact>
<contact> //contact entry for Chris
<default>
    <default_contact>chris@hotmail.com</default_contact>
    </default>
<presence>
    <status>Online</status>
    <status_message>Let's Chat!!!</status_message>
    </presence>
<name>
    <firstname>Chris</firstname>
    <middlename>J</middlename>
    <lastname>Doe</lastname>
    </name>
<address>
<address_1>
    <street>1234 Myroad</street>
    <apt_number>25a</apt_number>
    <city>SomeCity</city>
    <state>SomeState</state>
    <zip>55956</zip>
    </address_1>
<address_2>
    <street />
    <apt_number />
    <city />
    <state />
    <zip />
    </address_2>
    </address>
<contactinfo>
    <home_phone>555-444-4444</home_phone>
    <mobile_phone>555-777-6666</mobile_phone>
    <work_phone>555-663-3366</work_phone>
    <fax />
    <pager />
    <other />
    <email01>email01.com</email01>
    <email02>email02@yahoo.com</email02>
    <vision_name>MyName02@sprintpcs.com</vision_name>
    </contactinfo>
<business>
    <company>Government</company>
    <title>GrandPooBa</title>
    </business>
<memberships>
<email>
    <email_member>yes</email_member>
<SMS>
    <SMS_member>yes</SMS_member>
<MMS>
    <MMS_member>no</MMS_member>
<ptt>
    <ptt_member>no</ptt_member>
    <ptt_screenname> </ptt_screenname>
    </ptt>
<voice_command>
    <vc_member>yes</vc_member>
    <nickname />
```

TABLE 3-continued

```
        </voice_command>
    <instant_messaging>
        <im_member>yes</im_member>
        <im_alias>MyName02</im_alias>
        </instant_messaging>
    <lightvision>
        <lv_member>yes</lv_member>
        <lightvision_name>Chris Doe</lightvision_name>
        </lightvision>
        </memberships>
    <personal>
        <birthday />
    <marriage>
        <marital_status />
        <spouse />
        </marriage>
        </personal>
        </contact>
    </contact_all>
```

As shown in Table 3, the contact entry for Bob includes Bob's name, address, phone numbers, email addresses, and some information regarding his business. Next, the contact entry includes the memberships indicating the applications to which this contact entry is associated. For example, Bob is shown to be a member of the email application, the SMS application, the MMS application, and the PTT application as indicated in Table 2. The contact entry for Bob in Table 3 further illustrates that Bob is a member of the voice command application, the instant messaging application, and the lightvision application, for example.

Further, as shown in Table 3, Chris is a member of the email application and the SMS application, but Chris is not a member of the MMS application or the PTT application. Table 3 further illustrates that Chris is a member of the voice command application, the instant messaging application and the lightvision application, for example.

Thus, using the method 200 in FIG. 2, a given contact entry is tagged as being a member of one or more applications or services by using the contact entry in the application or for the service. Thus, by sending an SMS message to a given contact, the user has instructed the processor 102 to mark the given contact as an SMS member. To do so, the processor can populate the fields of the contact entry that correspond to the membership for the SMS application as shown in Table 3, for example.

Moreover, using the method 200 in FIG. 2, a user could initiate an application and enter a contact entry for use (rather than selecting a contact entry from the master contact list 108), and the contact entry would be tagged as a member of the application. For example, a user could initiate a PTT application and enter another user's name, phone number, etc., to begin a PTT session with the other user. By initiating a PTT session with the entered information, the processor 102 would mark the information (e.g., contact entry) as a PTT member (e.g., the user of the client station 100 does not have to execute the application to cause the processor 102 to mark the contact entry). Note that a user may initiate an application by opening the application, and a user may execute an application by opening the application and also causing the client station to perform functions using the application. (Further, the client station 100 might also add the newly entered information as a contact in the master contact list 108, and establish its association with the PTT application in the designation table 110). Therefore, the user may execute an application using a pre-existing contact entry from the master contact list 108 or using a contact entry that is entered after initiating the application, and in both instances, the processor 102 will mark the utilized contact entry as a member of the initiated or executed application.

Further, additional steps could be added to the method 200 in FIG. 2. For example, prior to designating the contact entry as a member that is associated with the application at block 206, the processor 102 may first wait for the successful completion of the application that is executed. In this manner, for example, if an SMS application is executed using a contact entry, the contact entry would be marked as a member of this application if execution of the SMS application was successful, i.e., if an SMS message was able to be sent to the contact. In such a case, that would indicate that the contact entry has SMS capabilities as well.

Figure 3:
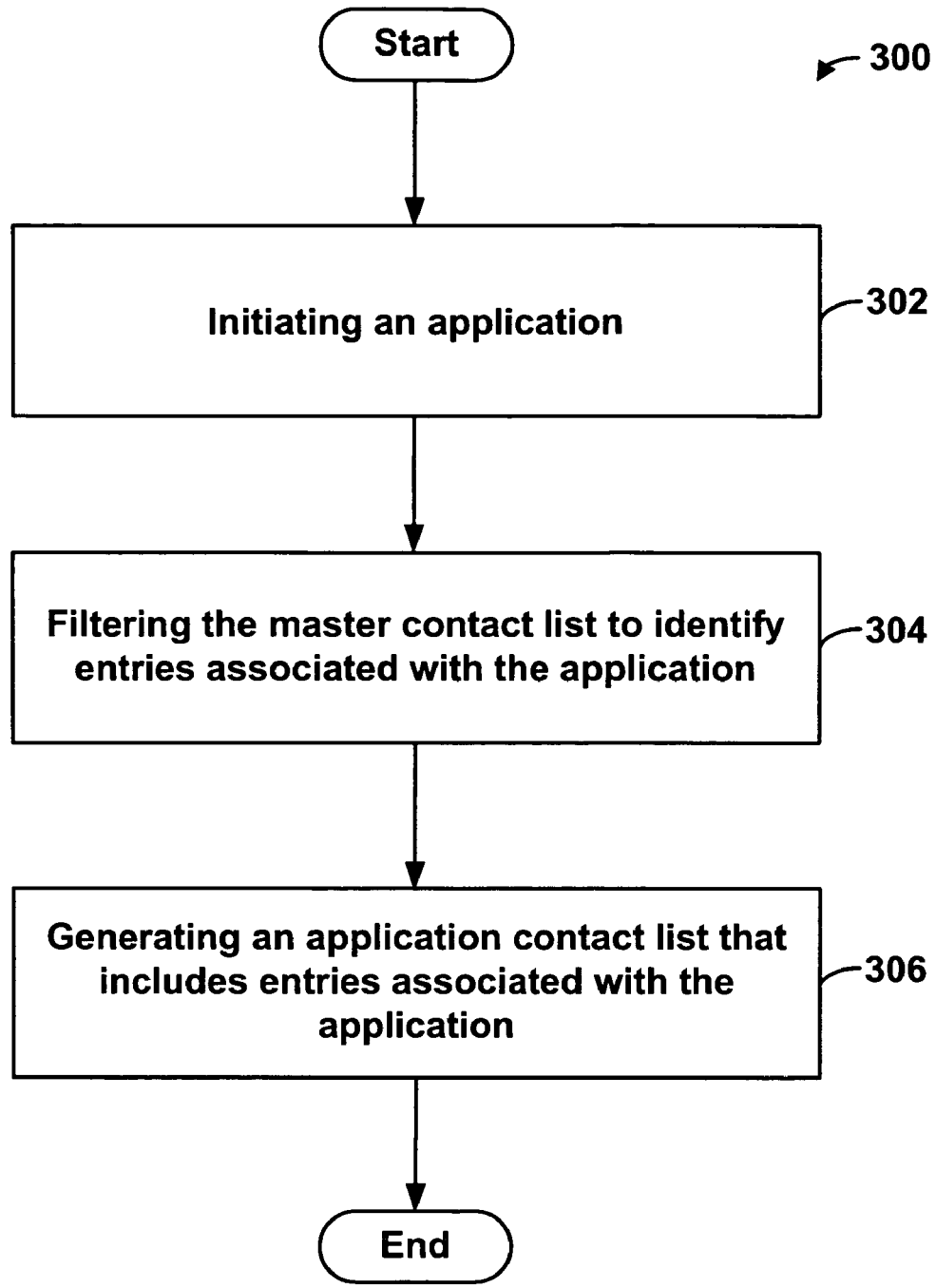
FIG. 3 is a flowchart depicting another embodiment of a method to establish an application contact list for a user of a client station.
Figure 4A:
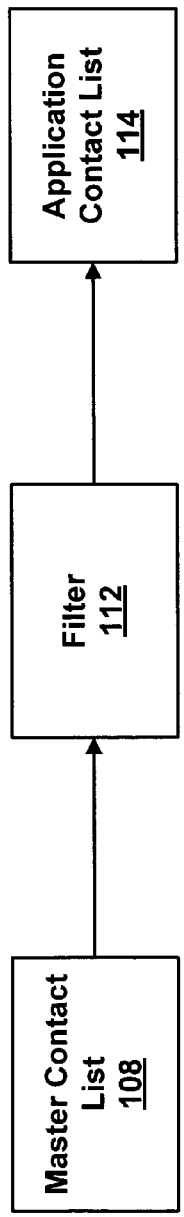
FIG. 4A is a flow diagram illustrating one embodiment of establishing the application contact list.

FIG. 3 is a flowchart depicting another embodiment of a method 300 to establish an application contact list, and FIG. 4A is a flow diagram illustrating one embodiment of establishing the application contact list. Initially, a user of the client station 100 will initiate an application, such as application 106, as shown at block 302. Subsequently, the processor 102 will filter the master contact list 108 to identify contact entries that are associated with the application 106, as shown at block 304. For example, if the user initiated an email application, the processor 102 will access the designation table 110 to identify all contact entries that have been marked as being members of the email application. The client station 100 may include a filter 112, as shown in FIG. 4A, to filter the master contact list 108, or the processor 102 may perform functions of a filter to identify the desired contact entries.

Next, the processor 102 (or filter 112) will generate an application contact list 114 that includes the contact entries that are associated with the application (i.e., contact entries that have been marked as being members of the application), as shown at block 306. Thus, by opening a service or an application, the user may trigger the client station 100 to filter the master contact list 108 and present the user with the pertinent contact entries for that service or application. As an alternative, the user may trigger the client station 100 to filter the master contact list 108 by initiating a contact listing mode in the application (at some point after opening the application). Of course, the user also has the option of viewing the master contact list 108 to view all of the contact entries, which also include contact entries that are not associated with the initiated application.

Figure 4B:
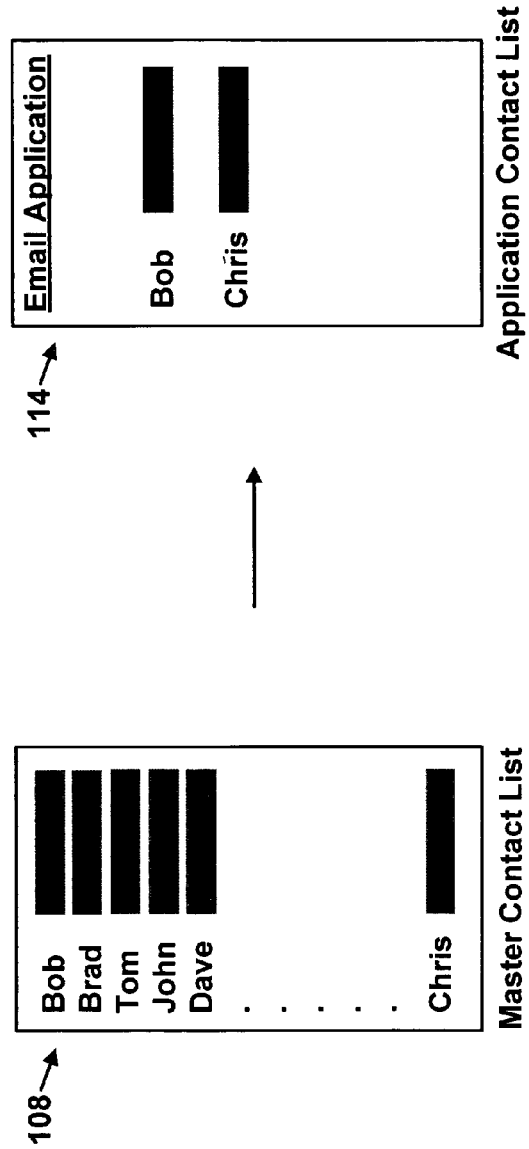
FIG. 4B pictorially illustrates one example of the filtering process of FIG. 3.

FIG. 4B conceptually illustrates one example of the filtering process of FIG. 3. Initially, the master contact list 108 is shown including all contact entries that a user of the client station 100 has entered. (The illustration in FIG. 4B is only one example of how the master contact list 108 and application contact list 114 may appear on a display of the client station 100). The master contact list 108 may include any number of contact entries, and thus the master contact list 108 can become very large. After initiating an application, for example an email application, the master contact list 108 is filtered and the application contact list 114 is generated. As shown in FIG. 4B, using the designations within Table 2 above, the master contact list 108 is reduced to the application contact list 114, which only includes Bob and Chris because those are the only contact entries within the master contact list 108 that are associated with the email application, for example. Thus, if the user of the client station 100 wanted to email Chris, instead of scrolling through the many entries of the master contact list 108, the user only has to choose between two contact entries.

The application contact list 114 may be temporarily stored in the data storage 104 for presentation to the user. In this manner, each time the user initiates an application, the processor 102 will filter the master contact list 108 to generate the specific application contact list. Alternatively, application contact lists can be stored permanently in the data storage 104, such that, after the user initiates an application, the processor 102 will access the stored application contact list for the initiated application.

In addition to establishing application contact lists, the client station 100 also may monitor and maintain the application contact lists. The client station 100 may monitor the designation table 110 to determine if a given contact entry has not been used within a predetermined time period for the applications of which the given contact entry is a member. If a contact entry has not been used within the predetermined time period, the client station 100 may remove the given contact entry's membership from the applications within which the contact has not been used. To do so, the client station 100 may record when contact entries are used and for what application they are used. For example, if a contact entry is a PTT member, but the user of the client station 100 has not executed a PTT application using the contact entry during the previous month, then the processor 102 may modify the designation table 110 such that the contact entry is no longer marked as a PTT member.

As another example, the client station 100 may maintain the application list designations by prompting the user of the client station 100 to determine if given contacts are still members of a given application. Further, the client station 100 could automatically send a message to a network to determine if the contact (e.g., network user) is still a member of an application group based on the user's possible subscription to a network service, for example.

Figure 5:
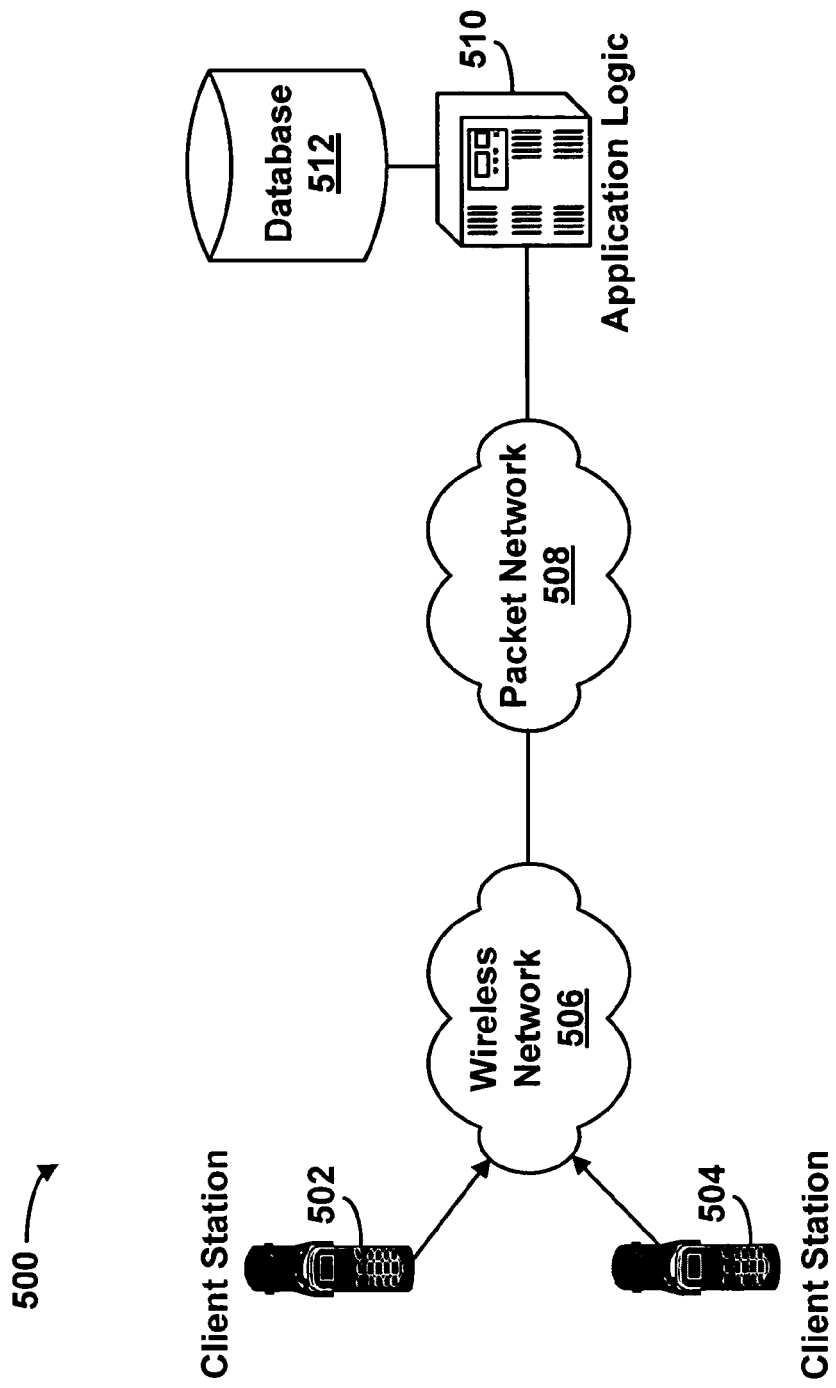
FIG. 5 is a block diagram illustrating one embodiment of a communication network that may establish an application contact list for client stations.

III. Method for Establishing an Application Contact List Using a Communication Network FIG. 5 is a block diagram illustrating one embodiment of a communication network 500 that may establish an application contact list for client stations. The network includes two client stations 502 and 504 coupled to a wireless network 506. The client stations 502 and 504 may be similar to the client station 100. The wireless network 506 includes many components (not shown for simplicity) such as a base transceiver station (BTS) that provides a wireless coverage area within which the BTS communicates with one or more client stations, like the client station 502, over an air interface. The wireless network 506 also includes a base station controller (BSC), which controls power levels and frequency allocation for the BTS and, in turn, communicates with a mobile switching center (MSC). The BSC and MSC can route calls through other networks. For example, the wireless network 506 may be connected to a circuit switched network, such as the public switched telephone network (PSTN), or to a packet switched network 508, such as the Internet, and the BSC in the wireless network 506 can route calls accordingly. The packet network 508 could be a signaling network, e.g., such as an SS7 network, connecting to a home location register (HLR) or a service control point (SCP), for example.

In the embodiment where the client device 502 is a wireless device, communications between the wireless network 506 and the client device 502 may occur in a digital format, such as code division multiple access (CDMA), time division multiple access (TDMA), global standard for mobile communications (GSM), or 802.11x, or they may occur in an analog format, such as advanced mobile phone system (AMPS). One exemplary wireless communications format is "CDMA 2000," such as described in EIA/TIA/IS-2000 Series, Rev. A (published March 2000), which is fully incorporated herein by reference.

The network 500 further includes application logic 510 coupled to the packet switched network 508. In turn, the application logic 510 is connected to (or includes) a database 512. The application logic 510 may be any server coupled to the packet switched network 508 that has the ability to signal (or be in communication with) the client stations 502 and 504. For example, the application logic 510 may be an HLR that defines services and features authorized for use by particular mobile subscribers, or an SCP that includes a subscriber profile database as well, indicating what service logic to provide for a particular subscriber. Other examples are possible as well.

The database 512 stores information regarding individual subscribers of wireless services for a particular wireless service provider. For example, the database 512 may include information concerning each subscriber's application memberships, such as whether or not a subscriber is a PTT subscriber. Thus, the database 512 may contain a table for each subscriber detailing the services to which the subscribers have access.

Further, the database 512 may contain a duplicate of client stations' master contact lists and corresponding designation tables. For example, the database 512 may contain information corresponding to each client station's contacts and contact designations for all client stations that subscribe to a particular wireless subscriber. In addition, client stations may synchronize information with the database 512 periodically so that the database 512 maintains a current copy of information within the client stations' master contact lists.

Figure 6:
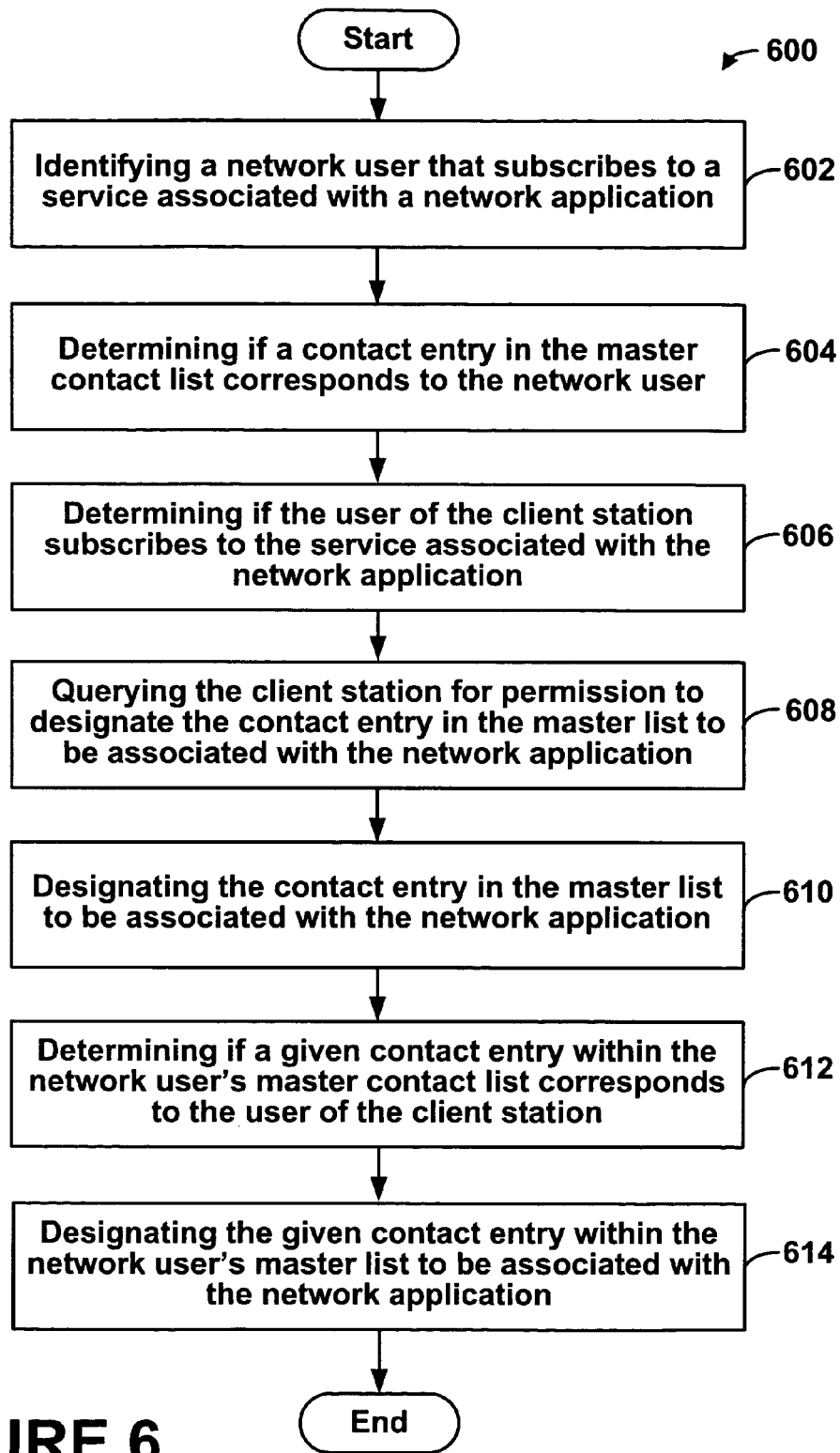
FIG. 6 is a flowchart depicting one embodiment of a method to establish an application contact list using the communication network.
Figure 7:
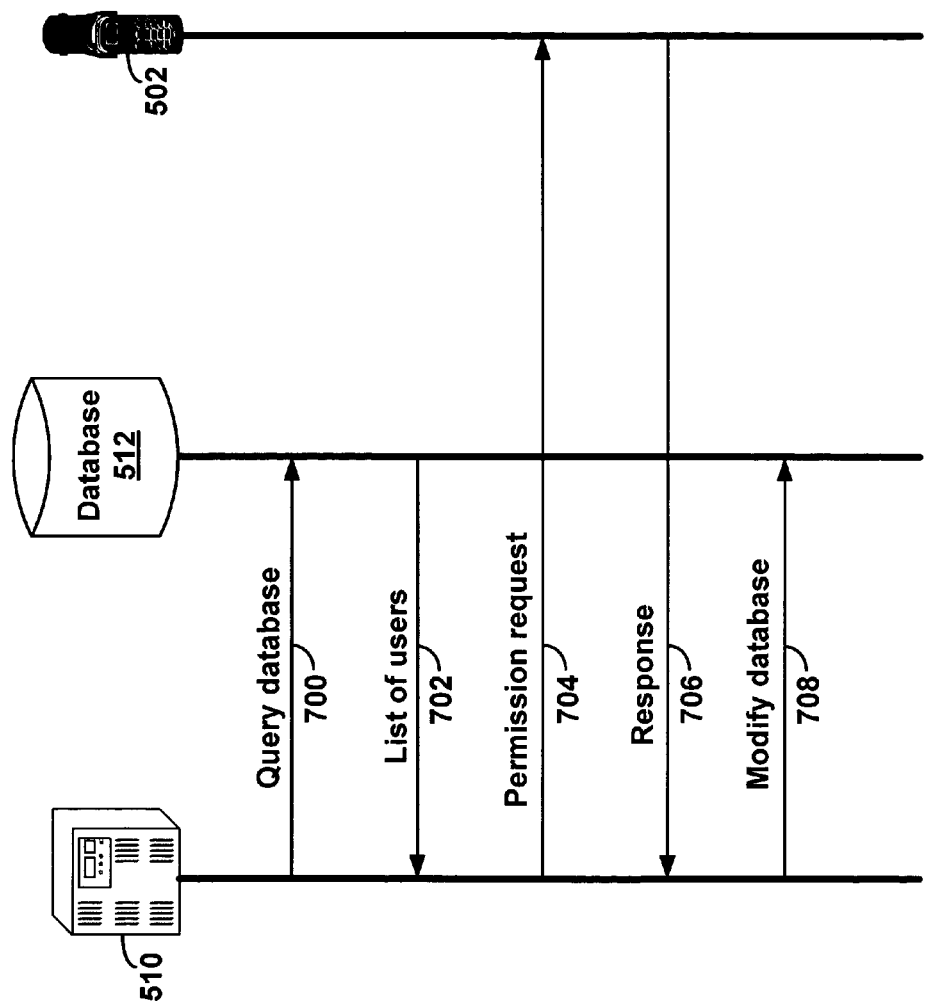
FIG. 7 is a flow diagram illustrating one embodiment of signaling within the communication network to perform the method depicted in FIG. 6.

FIG. 6 is a flowchart depicting one embodiment of a method 600 to establish an application contact list using the communication network 500, and FIG. 7 is a flow diagram illustrating one embodiment of signaling within the network 500 to perform the method 600 depicted in FIG. 6. The application logic 510 can function as a subscriber membership search engine for the client stations 502 and 504. Thus, initially, the application logic 510 will identify network users that subscribe to services associated with a network application, as shown at block 602. The client station 502 may ask the application logic 510 to perform the search, or the application logic 510 may periodically initiate the search on its own. To do so, the application logic 510 queries the database 512 to identify network users associated with a network application, as shown by message 700. The database 512 will return a list of users, as shown by message 702. For example, the application logic 510 will access the database 512 to identify all network users of the network 500 who are PTT subscribers.

The application logic 510 then determines if contact entries in the master contact list of the client station 502 correspond to any of the identified network users, as shown at block 604. For example, the application logic 510 will compare the list of users received from the database 512 with users in the client station's master contact list. If there is a match, the application logic 510 next determines if the user of the client station 502 subscribes to the service associated with the network application (i.e., the application to which the matched network user subscribes), as shown at block 606. If so, the application logic 510 may inform the client station 502 of the network users' subscription status, so that the client station 502 may mark the network users' contact entries as having a membership to the network application.

In addition, instead of just marking the network users' contact entries as having a membership to the network application, the application logic 510 may query the client station 502 for permission to designate the contact entries for the network user in the database 512 to be associated with the network application, as shown at block 608. For example, the application logic 510 may request permission from the client station 502, as shown by message 704, to update the database's version of the client station's master contact list. The user of the client station 502 will send a response 706 either granting or denying permission. If granted, the application logic 510 will designate the contact entry in the master contact list to be associated with the network application, as shown at block 610. For example, the database 512 will contain a copy of the client station's master contact list, and during a synchronization period, the application logic 510 will synchronize the information within the database 512 with the information within the master contact list of the client station 502. Alternatively, the application logic 510 may modify the database 512 such that network users in the database's version of the master contact list reflect the applications to which the network users are associated, as shown by message 708.

Next, the application logic 510 may determine whether to synchronize data within the database 512 with data within a master contact list of the matched network user. For example, after designating the network user as a member of a given network application within a copy of the client station's master contact list in the database 512, the application logic 510 may designate the client station 502 as a member of the application within a copy of the network user's master contact list in the database 512, but only if the client station 502 is a member of the network user's master contact list. Thus, the application logic 510 will determine if a given contact entry within the network user's master contact list corresponds to the user of the client station 502, as shown at block 612. If so, the application logic 510 will designate the given contact entry within the network user's master contact list to be associated with the network application, as shown at block 614.

The signaling shown in FIG. 7 may be accomplished using the hypertext transfer protocol (HTTP) or the SMS protocol. For example, the application logic 510 may send an HTTP GET message to the client station 502, and could receive a POST message in response. Further, multiple messages can be sent between the application logic 510 and the database 512 and between the application logic 510 and the client station 502 depending on the amount of information to transfer. Other signaling protocols may be used as well.

IV. CONCLUSION

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method of establishing an application contact list on a client station, wherein the client station includes a master contact list including a plurality of contact entries for a user of the client station, the method comprising:
    identifying a service associated with a network application to which the user of the client station subscribes;
    identifying a network user who subscribes to the service associated with the network application;
    determining if a contact entry in the master contact list corresponds to the network user;
    if so, sending a message to the client station instructing the client station to mark the contact entry in the master list with an identifier, wherein the identifier identifies the contact entry as a contact entry that is associated with the network application, and storing the identifier.

2. The method of claim 1, wherein marking the contact entry with the identifier comprises designating the contact entry as a member of the application contact list.

3. The method of claim 1, further comprising querying the client station for permission to mark the contact entry in the master list with the identifier, and if the permission is granted, marking the contact entry in the master list with the identifier.

4. The method of claim 1, wherein the network application resides on a network that includes application logic and a database with a duplicate of the master contact list, and wherein marking the contact entry in the master contact list with the identifier comprises the application logic marking the contact entry in the duplicate of the master contact list with the identifier.

5. The method of claim 1, further comprising:
    determining if a given contact entry within the network user's master contact list corresponds to the user of the client station; and
    if so, designating the given contact entry within the network user's master contact list to be associated with the network application.

\* \* \* \* \*